Patented July 10, 1945

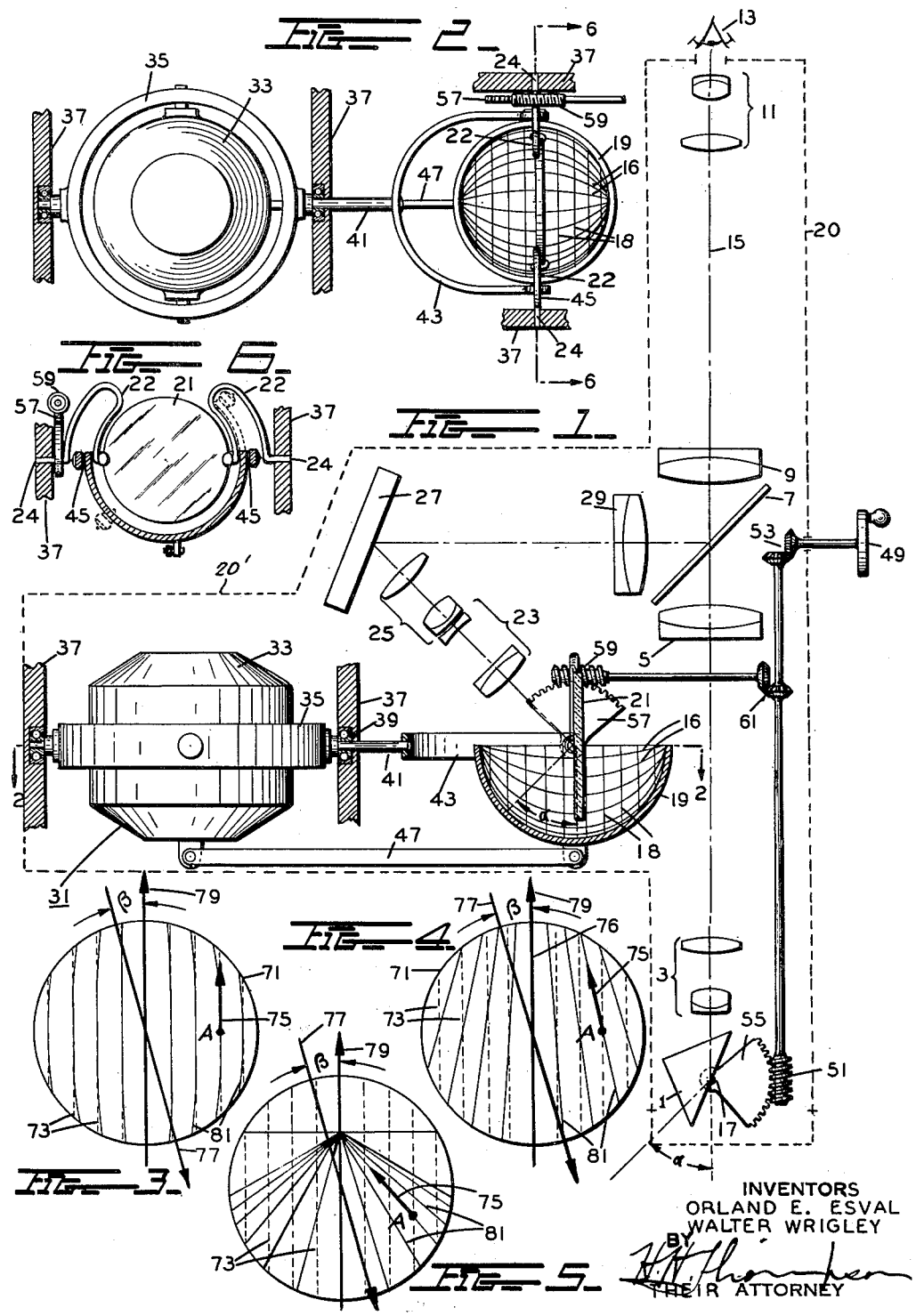

2,379,894

UNITED STATES PATENT OFFICE 2,379,894

DRIFT INDICATOR

Orland E. Esval, Merrick, and Walter Wrigley, Hempstead, N. Y., assignors to Sperry Gyroscope Company, Inc., Brooklyn, N. Y., a corporation of New York Application August 29, 1941, Serial No. 408,722

7 Claims. (Cl. 88—1)

The present invention relates to the art including devices for superposing a reticle upon a sighted image, such as drift indicators or ground speed indicators for aircraft.

One type of drift indicator includes a sighting device for sighting a fixed object on the ground, or a floating object on water, and a grid or reticle superposed on the ground image for determining the apparent direction of motion of this object with respect to the heading of the aircraft, thereby determining the angle of drift.

Difficulties arise in this type of instrument when sights are taken at considerable angles to the vertical, as is necessary with modern fast aircraft, with which any fixed ground object is rapidly left behind. With these large angles, any pitching or rolling of the craft will cause the fixed sighted object to jump around with respect to the reference reticle, so that a satisfactory sight and drift indication is difficult to obtain, if not impossible.

It is an object of the present invention to provide an instrument of the above type in which the reticle is fully stabilized in roll as well as pitch.

It is a further object to provide a reticle for a sighting instrument whose lines are always parallel to an imaginary net of parallel lines drawn on the ground, for any angle of sight.

It is another object of the present invention to provide a drift indicator or ground speed indicator having a reticle fully stabilized in both roll and pitch.

It is a still further object of this invention to provide an improved drift indicator or ground speed indicator for aircraft, having a reticle whose lines are always parallel to an imaginary net of parallel lines on the ground, for any angle of sight.

It is another object to provide an improved optical system for superposing a reticle image on a field of view.

Other objects and advantages will become apparent from the specification, taken in connection with the accompanying drawing wherein the invention is embodied in concrete form.

In the drawing,

Fig. 1 shows an elevation, partly schematic and partly in section, of the drift indicator.

Fig. 2 shows a plan view of the spherical segment reticle and its gyro-stabilization.

Figs. 3 to 5 show typical images obtained with this drift indicator sighting at angles approximately 0, 45° and 90°, respectively, with the vertical.

Fig. 6 shows a detail cross section of Figs. 1 and 2 taken along line 6—6 of Fig. 2.

Referring to Fig. 1, the main optical system of the instrument is composed of an entrance prism 1 which picks up the field of view and reflects it into the front element 3 of the optical system. The front element 3 projects the image of the field of view through objective 5 onto reflex mirror 7, where it is superposed upon the reticle image, as will be described. The combined reticle and field image is magnified by objective 9 and eye piece 11 before viewing by the eye 13 of the observer.

The reticle is formed as "longitude" meridians 16 and "latitude" parallels 18 drawn on the inner surface of a hemispherical segment 19. The image of the reticle is picked up by a mirror 21 pivoted at the "equatorial" diameter of segment 19 and projected through lens system 23 and front element 25 onto fixed mirror 27 by which it is reflected into objective 29 and thereby projected on reflex mirror 7 to be superposed on the field image obtained from prism 1.

Spherical segment 19 is stabilized in space from a gyro-vertical 31. A suitable mounting is shown in Figs. 1 and 2. Gyro rotor housing 33 containing the vertically spinning rotor is mounted in gimbal ring 35 which in turn is pivoted on housing 37 of the instrument. The pivot 39 of gimbal ring 35 is extended into shaft 41 to which is fastened clevis 43. Segment 19 is mounted on clevis 43 by pivots 45, and has a pivot axis parallel to that of rotor housing 33. The segment 19 is also linked to housing 33, as by link 47. The rotor housing 33, by virtue of its gyroscopic action, always tends to be maintained vertical. Gyro rotor housing 33 is provided with any suitable type of erecting mechanism to insure that its axis is maintained vertical at all times. Since segment 19 will turn about axes 41 and 45 together with the rotor housing 33, it will always be fixed with respect to a horizontal plane. That is, its polar axis will always be horizontal, and will be oriented in azimuth the same as the line of sight.

Mirror 21 is mounted independently of spherical segment 19 so as to pivot about a diameter of the segment no matter what position the segment 19 may assume relative to the mirror 21. Hence the pivotal axis of mirror 21 passes through the geometric center of the spherical segment 19. Fig. 6 illustrates one type of mirror mounting, in which mirror 21 is mounted on brackets 22 which are pivoted on casing 37 as by pivots 24. Gear sector 57 may be fastened to one of these pivots 24 to cause the mirror to pivot upon turning of worm 59. Brackets 22 are cut away or formed so as to avoid interference with the spherical segment 19 upon relative motion of the latter with respect to the mirror.

The axis 15 of the instrument is mounted vertically in the craft. That is, it will be truly vertical when the craft is horizontal, and is fixed relative to the craft. The prism 1 projects through the bottom of the craft. In order to be able to sight over the entire lower hemisphere, the prism is pivoted about an axis 17 to give varying angles of sight in elevation, and the entire instrument is rotatable in azimuth about axis 15. The casing and means for rotating is not shown, being conventional. The casing is indicated by dotted line 20. The angle between the vertical and the line of sight will be called the complementary elevation angle.

If it is imagined that a series of parallel lines is drawn on the ground, these lines, when viewed from an airplane, will all appear to converge toward a vanishing point at the horizon. If a parallel grid of lines were superposed on these converging lines, then, when looking straight down, the grid lines could all be made substantially parallel to the ground lines. However, when sighting at considerable angles to the vertical, only one grid line could be made parallel to one ground line, namely, that grid line which appears to pass through the ground line vanishing point. The remaining grid lines would appear to cross ground lines. This sort of grid is used in prior art devices but is unsuited to a drift indicator of the present type. In using such an instrument, a fixed object is sighted, which may be an object on the ground or a smudge pot dropped into the ocean, and the instrument is rotated about its vertical axis as by means of the lever-like lateral extension 20' on the casing 20 until the apparent path of the fixed object coincides with or is parallel to one of the grid lines. The angle between this grid line and the craft heading gives the angle of drift.

Fig. 3 illustrates one situation which may be encountered. This figure shows the field of view 71 of the optical system, with a parallel arrangement of grid lines 73. Point A is assumed to be a fixed object on the ground, nearly below the plane. That is, the instrument is sighting nearly straight downward. Arrow 77 is assumed to represent the heading of the plane, and arrow 79 the azimuthal orientation of the instrument line of sight. Arrows 77 and 79 subtend an angle $\beta$. When the instrument is properly set, $\beta$ will be the actual drift angle. In the instance illustrated in Fig. 3, the apparent path of object A will be along heavy arrow, 75, or parallel to one of the grid lines 73. In this case, therefore the drift angle $\beta$ may be determined by setting instrument axis 79 until the apparent path 75 of object A is observed to be parallel to one line of grid 73.

Where the line of sight is not vertical, but somewhat toward the horizon, a different situation prevails. Fig. 4 shows the field of view 71 for this case. The instrument is assumed to be correctly set; that is, $\beta$ is the actual drift angle. Now the apparent motion of object A, if A is not on axis 79, is no longer parallel to any of the lines 73, but is toward a distant vanishing point on the horizon.

Fig. 5 shows the case where the horizon is in the field of view. For these latter two cases, the criterion for determining the angle of drift $\beta$ can no longer be parallelism between grid lines 73 and apparent path 75 of object A. Such an arrangement of grid lines can therefore be used only when object A is directly on the center grid line 76, as then the apparent motion of object A would be along one grid line. The parallel grid arrangement is thus unsuited for general use with sighting angles appreciably different from the vertical.

The present invention overcomes this difficulty by the use of perspective grid lines or directional indicia. These lines are shown as lines 81 in Figs. 3, 4 and 5. Lines 81 are always parallel to the apparent path 75 of object A across the field of view 71 no matter what elevational angle of sight is used. It is no longer necessary to use only the central grid line. This is obtained by use of the spherical segment 19 and its reticle.

Referring to Figs. 1 and 2, the control of entrance prism 1 to scan or cover various elevation angles is secured by some means such as a control wheel 49 operating a worm 51 through gearing 53. Prism 1 may be mounted on a worm gear sector 55 pivoting by turning worm 51 which meshes with sector 55. In order to provide the proper perspective grid of lines to be superposed on the field of view image, mirror 21 is rotated in synchronism with prism 1. A suitable means is illustrated as gear sector 57 rotating mirror 21 about segment diameter 24—24. Sector 57 is controlled by worm 59 which is also connected to control wheel 49, as by gearing 61. The gear ratios used are selected so that prism 1 and mirror 21 are turned simultaneously through equal angles.

In this way it is assured that the portion of the reticle superposed on the field of view at reflex mirror 7 will correspond, for all angles of elevation, to the apparently parallel lines of that field. Thus, when sighting vertically downward (complementary elevation angle $\alpha=0$), mirror 21 picks up the portion of the reticle at the bottom of the spherical segment, where the "meridian" lines are substantially parallel, as shown by lines 81 of Fig. 3. When angle $\alpha$ is about 45°, as shown in Fig. 2, the grid lines are slightly converging, as shown by lines 81 of Fig. 4. And when $\alpha$ is about 90°, corresponding to a nearly horizontal sight, the grid lines are definitely concurrent, as shown in Fig. 5. At all times and all complementary elevation angles, the "meridian" lines in the superposed image are parallel to the apparently parallel lines of the field of view.

The "latitude" lines of the spherical segment reticle are always perpendicular to the azimuth axis of the instrument; that is, to the azimuthal direction of the line of sight.

Another failing of the type of art device explained above has been that rolling and pitching of the craft would seriously impair the determination of drift angle. The component of this craft motion which produces an apparent motion of the sighted object A (relative to the field of view) along the line 75, which is the line of apparent motion of object A due to forward travel of the craft, is not a serious objection, as it does not impair the determination of parallelism between line 75 and grid line 81, but only changes the apparent speed of object A along line 75. However, the component at right angles to line 75 would seriously impair the use of the instrument, as it apparently causes object A to move off line 75. This motion may be called "roll" with respect to the instrument.

The present invention overcomes the problem of roll by stabilizing the reticle with respect to the ground. Thus, by stabilizing segment 19 by a gyroscope as shown in Figs. 1 and 2, the reticle is kept in fixed relation to the ground by maintaining the same relation to the field of view as is done by the ground. This is, if the craft should tilt with respect to the ground, a different portion of the ground would appear in the field of view, due to relative angular motion of optical axis 15 with respect to the ground. But at the same time, the same relative angular motion occurs between mirror 21 and segment 19, so that a different and corresponding portion of the reticle appears in the field of view. These actions are so synchronized that object A stays in its particular line 81, even though both are shifted relative to the field of view.

To gain the above result it is necessary to have equal magnifications in the optical systems of the ground image and reticle image, so that the angular field of view of the entrance prism will be the same as the angular field of view of the reticle image, which will assure proper perspective convergence in the reticle lines when superposed on the ground image. Furthermore, any angular change in the ground image should be accompanied by an equal angular change in the reticle image. The last requirement necessitates a pick up lens for the reticle image having a focal length equal to the radius of the spherical segment 19, which lens should be placed at the center of the spherical segment in order to pick up images from any part of the segment.

It is impossible to place a lens in this position, as the mirror 21 is in that exact location. To overcome this difficulty, there is provided a reverse telephoto lens 23. This lens system is designed to have an effective focal length equal to the segment radius, but a "back focus," which is the distance from the focal point to the nearest lens of the system, of at least twice this radius, so that relative movement of segment 19 and optical system during maneuvers of the craft will not produce mechanical interference between these elements.

Optical elements 25 and 29 merely serve to magnify and project the reticle image on the reflex mirror 7.

The complementary elevation angle α between the line of sight and the vertical varies from zero to 90°, to cover the entire hemisphere below the aircraft. Hence prism 1 needs to rotate only 45°. The same is true of mirror 21. For this reason, it is not necessary to provide a complete hemispherical segment 19, only part of this segment being needed. This segment must include, in "latitude," only an angle of 90° plus half the angular field of view on each side and thus, if the field of view subtends 30°, only 120° of "latitude" are needed. Also, in "longitude," the complete 180° are not needed, since large angles of roll of the instrument axis are rarely met. A further limitation arises from the gyroscope, which may be designed for only a limited angle of roll. For example, the gyroscope may permit a roll of 45° from the vertical. Then the angle of "longitude" covered by the reticle need be this angle plus half the field of view, or, in the example used above, 60° each side of the vertical, totaling 120°.

The instrument described above may also be used as a ground speed indicator. Thus, if the "latitude" lines on segment 19 are drawn with constant intervals of latitude, then, by observing the time necessary for the sighted object A to pass over a fixed latitude interval, it is possible, by knowing the craft altitude, to accurately compute the ground speed of the craft. This speed will, of course, be inversely proportional to the time taken by the object to pass a predetermined latitude interval. The constants of proportionality depends on the craft altitude.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A drift indicator instrument rotatable about the normally vertical axis of an aircraft, comprising means for sighting a fixed ground object along varying azimuthal and elevation angles, including an entrance prism rotatable about a normally horizontal axis, a spherical segment, means for stabilizing said segment so as to maintain a predetermined diameter of said segment horizontal, said segment having marked thereon a reticle comprising latitude and longitude lines of said spherical segment formed with said diameter as a polar axis, and means for superposing an image of a portion of said reticle upon the image of said object, whereby the apparent motion of said object may be compared with the orientation of the adjoining lines the latitude of the center of said portion being equal to the complementary elevation angle of said line of sight of said object, said last named means including a rotatable mirror pivoted about an axis passing through the geometric center of said segment and parallel to said horizontal prism axis, means for rotating said mirror and said prism simultaneously through equal angles, a reflex mirror, means for projecting said reticle image upon said reflex mirror including a reverse telephoto lens system having an effective focus equal to the radius of said segment and having a back focus at least twice said radius, and means for projecting said object image on said reflex mirror.

2. In a drift indicator for aircraft, means for sighting on objects displaced from the ground track of said aircraft, means for forming an image of a selected object, directional indicia comprising lines simulating spaced parallel ground lines extending toward a vanishing point, means for selecting a portion of said indicia in accordance with the bearing of said object, and means for forming a superimposed image of said selected portion and said object image.

3. A drift indicator for aircraft, comprising means for sighting on objects spaced laterally from the ground track of said aircraft, means for forming an image of said objects, a concave segment, a drift-indicating grid comprising meridional lines disposed at intervals about the concave surface of said segment, the poles of said meridional lines extending fore and aft of said aircraft, means for sighting on a portion of said grid correlated with the bearing of said object relative to said craft, and means for superposing an image of said portion on said object image to simulate lines parallel to the ground track and extending to a vanishing point.

4. In an aircraft drift-indicating instrument, the combination including means for sighting on a distant ground object moving relatively to said instrument, means for forming an image of said object, and means for determining the direction of such relative movement comprising a grid having lines of progressively increasing mutual convergence to simulate ground lines extending to a vanishing point on the ground track, means for sighting on a portion of said grid in accordance with the bearing of said object, means for superposing an image of said portion on said object image, and means for orienting said grid until said object appears to move along said lines.

5. A drift angle indicator for aircraft comprising means for sighting on an object displaced from the ground track of said aircraft, means for forming an image of said object, and means for denoting the apparent direction of travel of said aircraft relative to said object comprising a reticle having lines converging toward a point to simulate the appearance of ground lines parallel to the ground track extending to a vanishing point on the ground track, means for sighting on a portion of said lines along a line correlated with the orientation of the line of sight to said object, means for forming an image of said portion superposed on said object image, and means for orienting said reticle to align the one of said converging lines with the motion of said object.

6. A drift indicator for aircraft, comprising means for sighting a distant ground object and forming an image thereof, a drift indicating reticle comprising a spheroidal segment having meridional lines defining an equatorial and a polar region of said segment, means for observing and forming an image of a portion of said reticle lines superposed on said object image, means for maintaining said observed portion at a latitude on said segment correlated with the complementary elevation angle of the line of sight of said object, and means for orienting the lines of said reticle image relative to said object image so as to orient the polar axis of said segment parallel to the ground track of said aircraft.

7. In a drift indicator for aircraft, means for sighting on a ground object displaced from the ground track of said aircraft, means for forming an image of said object, a grid defining spaced meridional lines of a spherical contour arranged to simulate ground lines spaced from said ground track and appearing to converge toward an apparent vanishing point on the ground track, and means for forming and superposing on said image an image of a portion of said grid at a latitude on said spherical contour corresponding to the complementary elevation angle of said line of sight.

ORLAND E. ESVAL.
WALTER WRIGLEY.